(12) United States Patent
Feistel

(10) Patent No.: US 6,267,380 B1
(45) Date of Patent: Jul. 31, 2001

(54) CHOKE ARRANGEMENT AND A METHOD FOR OPERATING SAID CHOKE ARRANGEMENT

(75) Inventor: Norbert Feistel, Winterthur (CH)

(73) Assignee: Maschinenfabrik Sulzer-Burckhardt AG, Basel (CH)

( * ) Notice: Subject to any disclaimer, the term of this patent is extended or adjusted under 35 U.S.C. 154(b) by 0 days.

(21) Appl. No.: 08/981,168
(22) PCT Filed: Jun. 4, 1996
(86) PCT No.: PCT/CH96/00212
§ 371 Date: Dec. 11, 1997
§ 102(e) Date: Dec. 11, 1997
(87) PCT Pub. No.: WO97/00393
PCT Pub. Date: Jan. 3, 1997

(30) Foreign Application Priority Data

Jun. 14, 1995 (EP) .................................. 95810398

(51) Int. Cl.$^7$ ............................. F16J 15/16; F16J 15/56
(52) U.S. Cl. ..................... 277/309; 277/311; 277/308; 277/589
(58) Field of Search ..................... 277/435, 447, 277/448, 459, 465, 489, 490, 308, 309, 311

(56) References Cited

U.S. PATENT DOCUMENTS

| | | | |
|---|---|---|---|
| 2,296,116 | * 9/1942 | Pelc | 277/489 X |
| 2,456,356 | * 12/1948 | Aber . | |
| 2,626,193 | * 1/1953 | Patterson | 277/489 X |
| 2,914,348 | 11/1959 | Kroekel . | |
| 3,347,555 | * 10/1967 | Norton | 277/448 X |
| 3,658,348 | * 4/1972 | Nink | 277/500 |
| 3,862,480 | * 1/1975 | Packard et al. | 277/435 X |
| 4,123,068 | * 10/1978 | Van Gorder | 277/448 X |
| 4,674,754 | * 6/1987 | Lair et al. . | |
| 4,736,586 | * 4/1988 | Kawajiri et al. | 277/465 X |
| 5,143,382 | * 9/1992 | Maringer . | |
| 5,618,048 | * 4/1997 | Moriarty | 277/489 X |

FOREIGN PATENT DOCUMENTS

| | | |
|---|---|---|
| 42 01 246 | * 12/1993 | (DE) . |
| 4201246C2 | 12/1993 | (DE) . |
| 2060092A | 4/1981 | (GB) . |
| 2219636A | 12/1989 | (GB) . |

\* cited by examiner

*Primary Examiner*—Chuck Y. Mah
*Assistant Examiner*—Vishal Patel
(74) *Attorney, Agent, or Firm*—Townsend and Townsend and Crew LLP

(57) ABSTRACT

The choke arrangement comprises an elastic choke ring which consists of a single piece with a gap formed by a parting joint. The choke arrangement further comprises a support ring which is arranged directly adjacent to the choke ring in the axial direction, with the support ring serving, among other things to cover over the gap of the choke ring. An advantage of the choke arrangement with an elastically resilient choke ring is to be seen wherein the choke ring reacts to dynamic pressure changes and thereupon changes its sealing properties. A peak in pressure produces an increased difference in pressure at the choke arrangement, whereby the elastic choke ring is pressed against the sliding surface of a piston rod and effects an increased sealing action, so that the pressure peak cannot propagate to a sealing ring placed after the choke arrangement. The choke arrangement thus behaves analogously to a frequency selective filter known from electrical engineering in that high-frequency pressure changes are sealed off, whereas static or slowly varying pressure components are not sealed off.

15 Claims, 5 Drawing Sheets

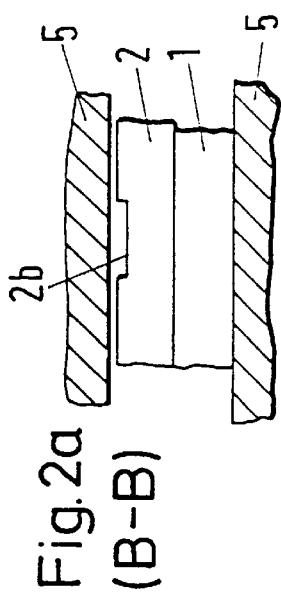
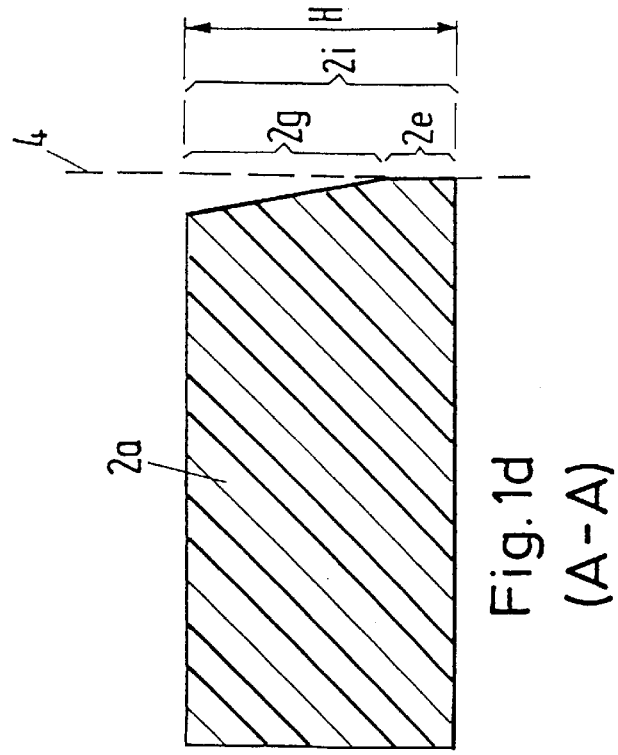
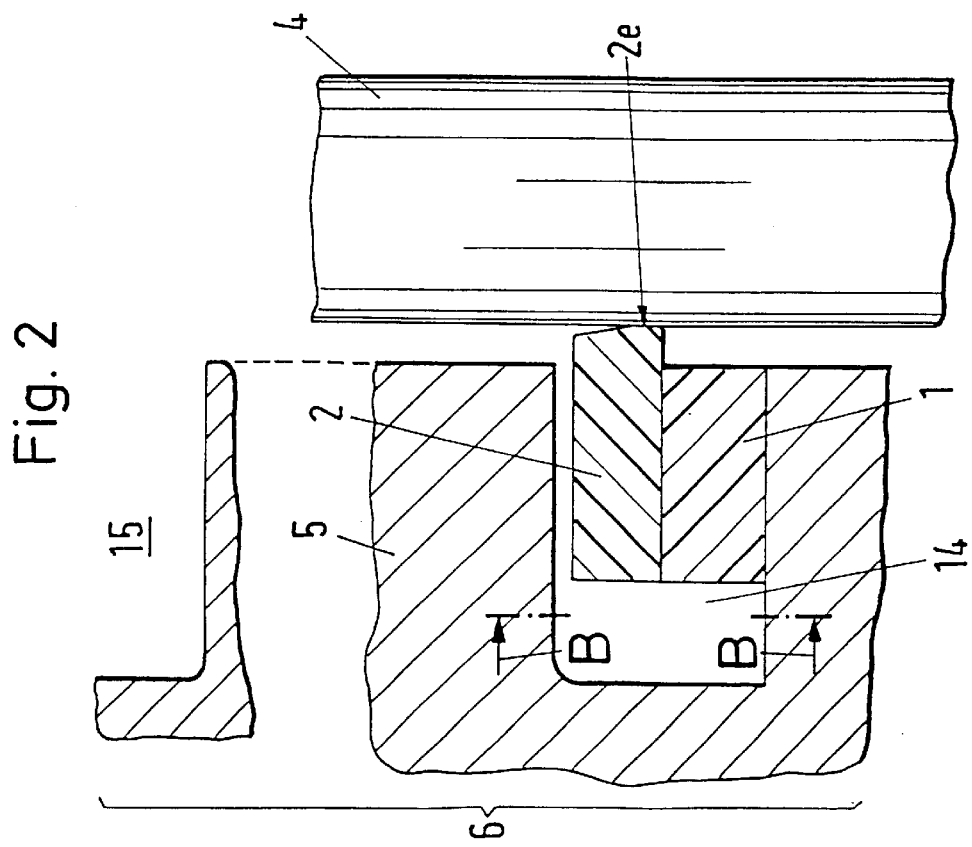

CHOKE ARRANGEMENT AND A METHOD FOR OPERATING SAID CHOKE ARRANGEMENT

BACKGROUND OF THE INVENTION

1. Field of the Invention

The invention relates to a choke arrangement including a choke ring with a parting joint and a support ring. The invention relates further to a method for the operation of the choke arrangement.

2. Description of the Prior Art

Sealing rings are usually arranged pairwise one behind the other in series and form, in this manner, a so-called packing. The pressure difference acting on the individual sealing rings causes their sealing surfaces to be pressed onto the sliding surfaces of the body to be sealed, for instance a piston rod. In addition, a choke arrangement comprising at least one choke ring is arranged at one side of the packing. A packing of this kind with a choke ring and sealing rings is known, for example, from the patent CH 439 897. The choke ring of this known arrangement has the disadvantage that pulsating pressure components are only insufficiently damped. This leads to rapid wear of the sealing rings arranged behind it.

SUMMARY OF THE INVENTION

The object of the present invention is to overcome these known disadvantages of choke rings.

The choke arrangement in accordance with the invention comprises a choke ring which, in a preferred embodiment, consists of a single piece with a parting joint forming a gap. In addition, the choke ring has elastic behavior. The choke arrangement further comprises a support ring which is placed to lie directly adjacent to the choke ring in the axial direction, with the support ring serving, among other things, to cover over the parting joint of the choke ring so that the choke arrangement is impervious in the region of the parting joint. The choke ring requires no further elements such as, e.g. a hose spring surrounding the ring. The choke ring is placed directly against the sliding surface of the body to be sealed, e.g. a piston rod. An advantage of the choke arrangement with an elastically resilient choke ring having a parting joint is to be seen in the fact that the choke ring reacts to dynamic changes in pressure and in so doing changes its sealing properties. The choke arrangement in accordance with the invention is suitable, in particular, for damping pressure peaks such as can arise at the piston rod of a dry running piston compressor. A pressure peak causes an increased pressure difference at the choke arrangement through which the elastic choke ring is pressed against the sliding surface of the piston rod and produces a higher sealing action so that the pressure peak cannot propagate to a sealing ring placed after the choke arrangement. The choke ring in accordance with the invention is executed as a highly leaky ring which hardly seals off constant pressure components at all. As a result of its elastic properties the choke arrangement in accordance with the invention, however, has a high adaptability in form with respect to the piston rod for dynamic pressure components so that it lies in contact with the piston rod as a result of a dynamic pressure rise and seals to an increasing extent. The high adaptability in shape is enabled among other things by the choke ring having a parting joint forming a gap in the peripheral direction. The parting joint is made in such a manner that it does not close even when the choke ring is dynamically pressed against the piston rod in order to thus achieve an adaptability in shape which is as advantageous as possible. The choke arrangement in accordance with the invention has the advantage that it seals off only the dynamically variable pressure components, with the ability of the choke arrangement to respond being variable within a wide range through the geometrical execution of the choke ring, its elastic properties, and further parameters such as the choice of material. The choke arrangement thus behaves analogously to a frequency selective filter known from electrical engineering in which high frequency pressure changes are sealed off whereas static or slowly varying pressure components are not sealed off.

BRIEF DESCRIPTION OF THE DRAWINGS

The invention will be explained in the following with reference to several exemplary embodiments.

FIG. 1d is a cross-section through a choke ring along the line A—A in FIG. 1b;

FIG. 2 is a radial section through a choke arrangement in accordance with the invention in the installed state;

FIG. 2a is a view along the section B—B of FIG. 2;

DESCRIPTION OF THE PREFERRED EXEMPLARY EMBODIMENTS

Figure 1B:
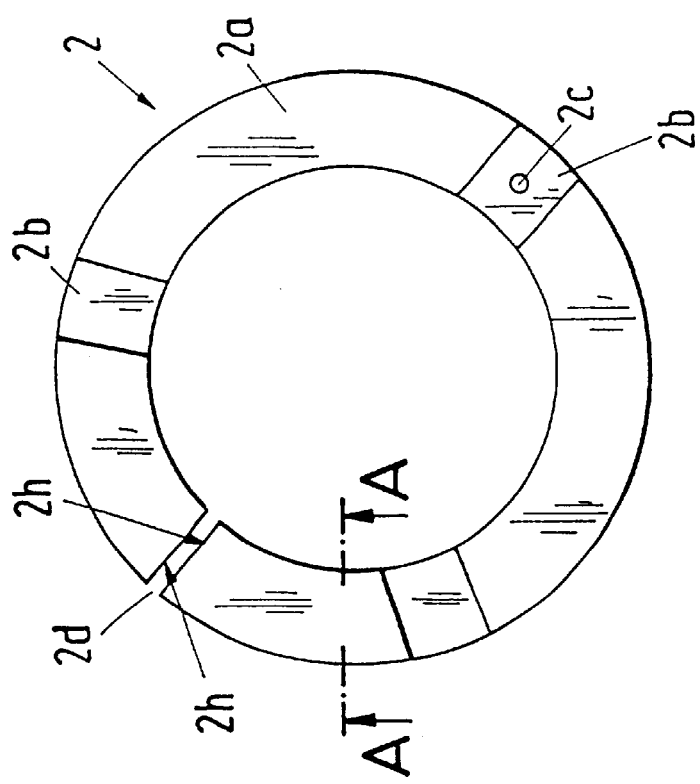
FIG. 1b is a plan view of a choke ring.

The choke arrangement in accordance with the invention comprises a choke ring 2 as well as a support ring 1 lying in contact in the axial direction. The support ring 1 illustrated in FIG. 1a as well as in FIG. 1f has a ring surface 1a, a cut-out 1c which serves as a guide for a fixing pin 2c, as well as recesses 1b in the surface facing the piston rod 4. The recesses 1b extend over the entire width of the support ring 1. Furthermore, the support ring 1 has a cover region 1d extending in the peripheral direction which comes to lie over the parting joint 2d of the choke ring 2 in order to seal off the parting joint 2d in the axial direction, or in the direction of motion of a piston rod 4. The support ring 1 is executed as a so-called endless ring, which is also designated as an uncut ring. This means that the ring has no parting joint but is made without any interruption in the peripheral direction.

Figure 1A:
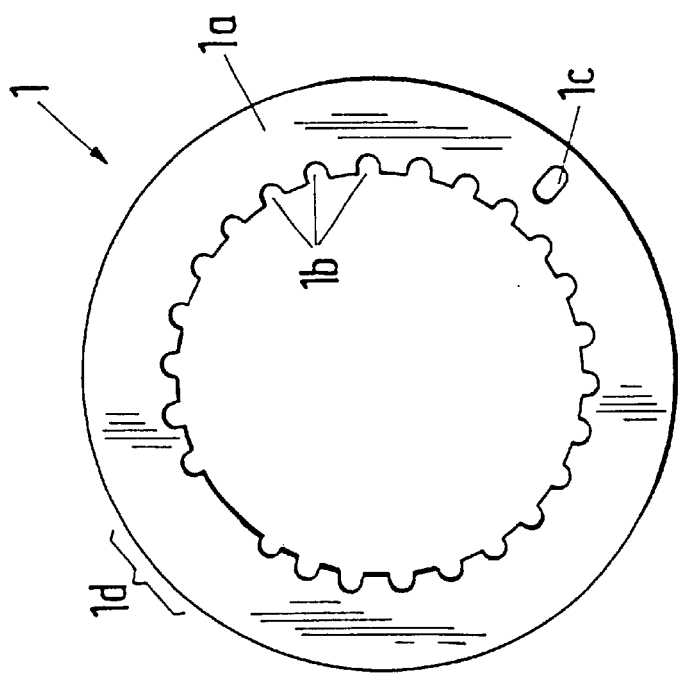
FIG. 1a is a plan view of a support ring.

FIG. 1b shows a choke ring 2 with a ring body 2a as well as grooves 2b extending in the radial direction, a fixing pin 2c which protrudes in the form of a cylinder, as well as a parting joint 2d on the side opposite to the fixing pin 2c. The choke ring 2 has elastic, resilient properties. The width of the parting joint or ring gap 2d is dimensioned in such a manner that the choke ring 2 can completely surround a piston rod 4 without a mutual contact of the ring body 2a resulting in the parting of joint 2d. It is thereby ensured that the choke ring 2 has an advantageous adaptability in form with respect to the piston rod 4. If a mutual contact of the two parting joint surfaces 2h in the parting joint 2d were to result due to these encountering one another, then this would have the effect that the choke ring 2 does not lie in full contact with the piston rod 4.

The support ring 1 and the choke ring 2 can be put together in such a manner that the protruding fixing pin 2c of the choke ring 2 is inserted into the cut-out 1c so that the support ring assumes a definite position with respect to the choke ring 2 and so that it is ensured that the cover region 1d comes to lie over the parting joint 2d.

Figure 1C:
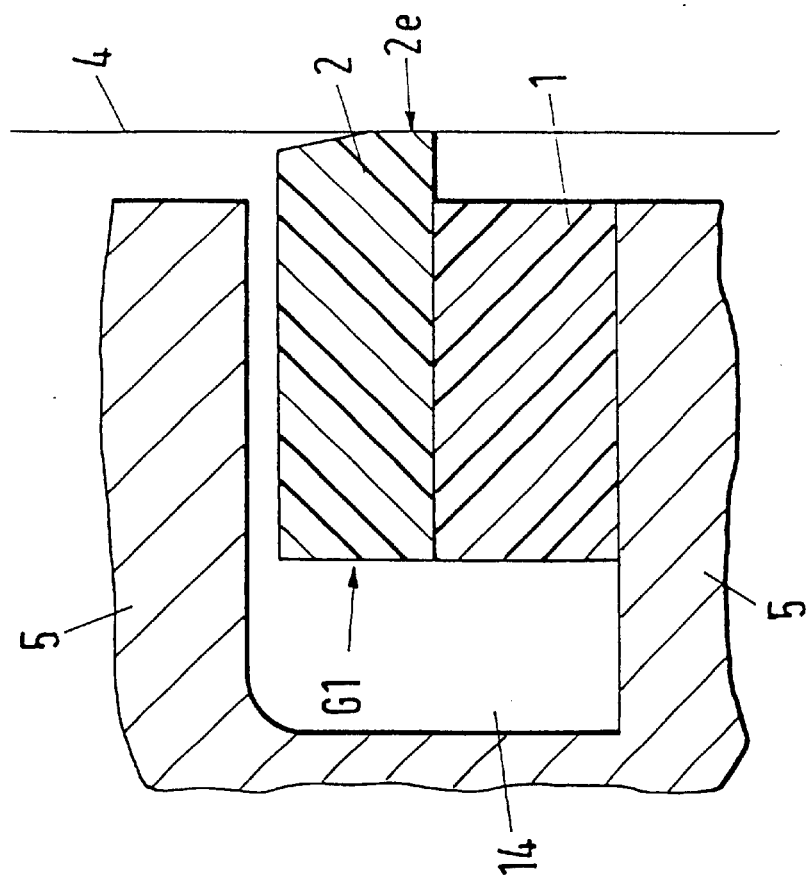
FIG. 1c is a further exemplary embodiment of a support ring.

FIG. 1c shows a further exemplary embodiment of a support ring 1 with ring surface 1a, cut-out 1c and recesses 1b. FIG. 1d shows an exemplary embodiment of a cross-section through the choke ring 2 along the line A—A in FIG. 1b. The ring body 2a can be made rectangular or, as in the present exemplary embodiment, in such a manner that the surface 2i of the ring body 2a facing the piston rod 4 has a sealing surface 2e as well as a part 2g diverging with increasing distance from the surface of the piston rod 4. The ring body 2a has a height H in the axial direction.

Figure 1E:
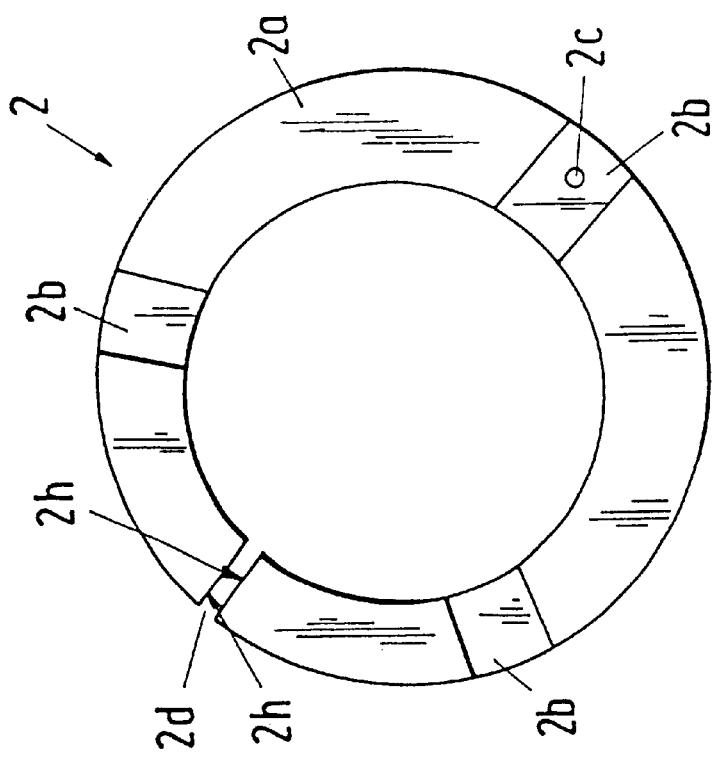
FIG. 1e is an eccentric embodiment of a choke ring.
Figure 1F:
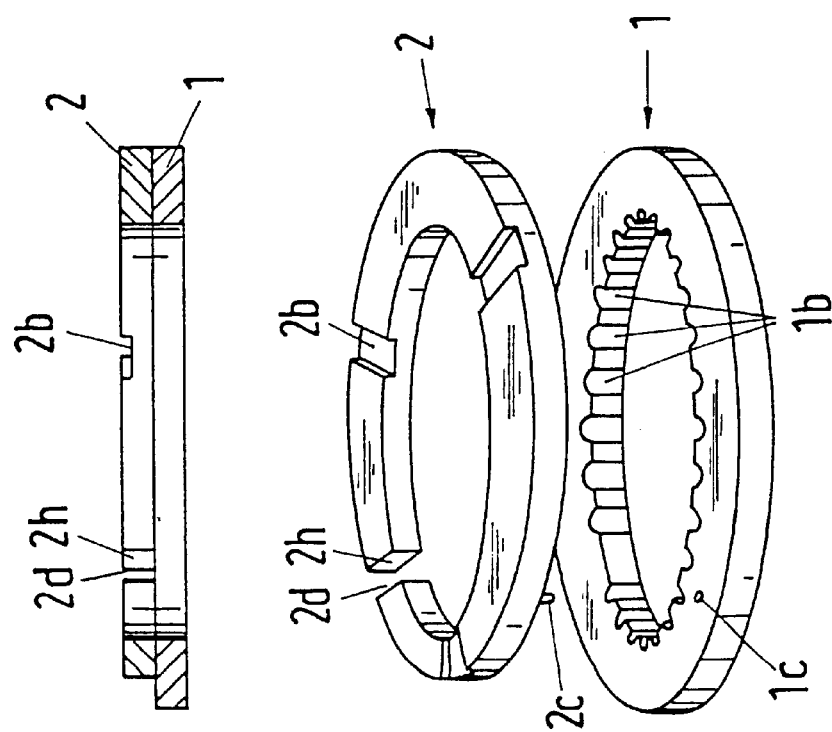
FIG. 1f is a cross-section as well as a perspective view of a choke arrangement.

FIG. 1e shows a choke ring 2 whose width in the radial direction is greatest in the region of the fixing pin 2c, with the width continually decreasing towards the gap 2d. A choke ring 2 thus executed has the advantage that it can surround a piston rod very uniformly. A piston rod 4 surrounded by a choke ring 2 extends concentrically with respect to the outer peripheral line of the choke ring 2. The parting joint 2d or the parting joint surfaces 2h, respectively, extend in a radial direction and thus perpendicular to the surface of the piston rod 4. Such a so-called butt joint is suited very well for the choke ring 2 in accordance with the invention since the two parting joint surfaces 2h can be moved relative to one another, and thus the choke ring 2 can lie in contact with the piston rod 4 without restraint by the parting joint 2d.

FIG. 2 shows a radial section through a choke arrangement arranged in a piston compressor. The choke arrangement is arranged in a chamber ring 5 which is a part of a packing 6 which opens into a cylinder space 15. The choke arrangement with the choke ring 2 and the support ring 1 is arranged in a chamber 14.

FIG. 2a shows a section from the point of view of the line B—B. From this view the arrangement of the choke arrangement with the choke ring 2 and the support ring 1 in the chamber 4 can be recognized. Furthermore the path of the radially extending groove 2b of the choke ring 2 can be seen.

Figure 2B:
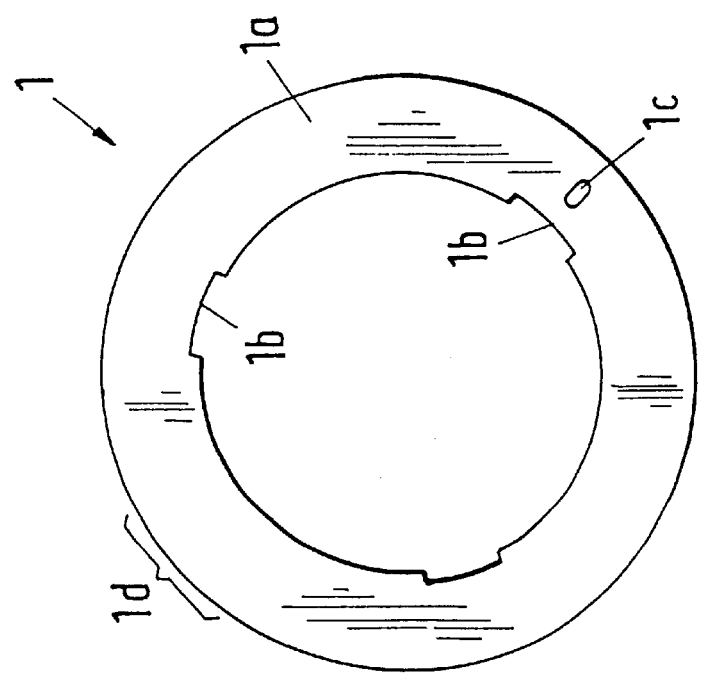
FIG. 2b is a further radial section of the choke arrangement in accordance with the invention in the installed state and FIG. 3 is a plot of the pressure as a function of time.

FIG. 2b shows the choke arrangement of FIG. 2a in an enlarged view. A pressure peak within the chamber ring has the effect that the resulting pressure difference acts on the choke ring 2 as a force acting in the radial direction Gl so that the latter choke ring is pressed with its sealing surface 2e against the piston rod 4, resulting in an increased pressure drop over the sealing surface 2e. The chamber 14 is sealed in the axial direction by the support ring 1, which lies on the chamber ring 5, as well as by the choke ring 2 so that the pressure peak does not propagate into the succeeding packing region.

Figure 3:
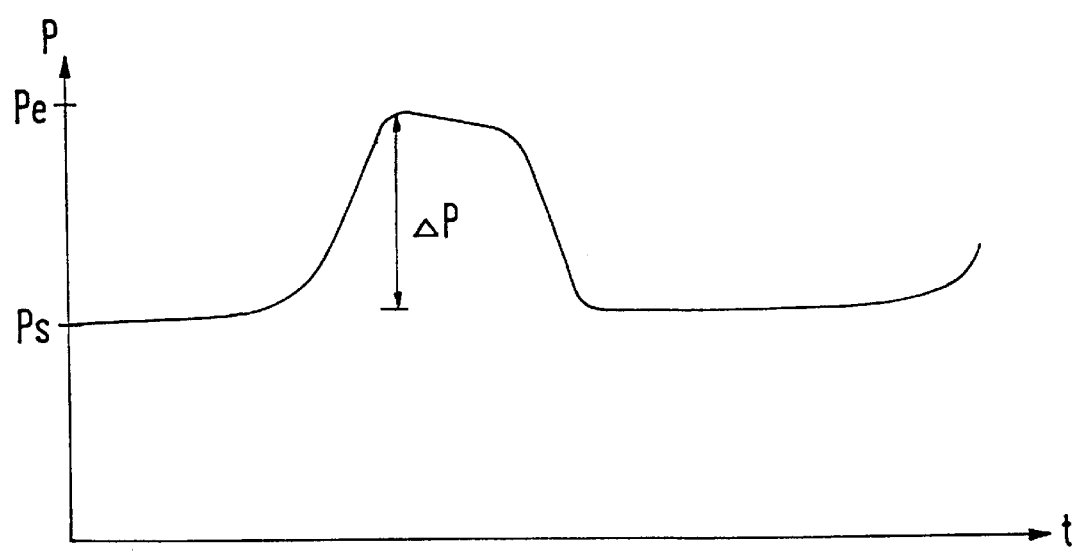

FIG. 3 shows a plot of the pressure as it impacts on the choke arrangement from the direction of the cylinder space 15. The pressure plot has an approximately static pressure Ps on which dynamic pressure peaks with a pressure rise delta P and a peak pressure value Pe are superimposed. The choke arrangement enables sealing off of the dynamic pressure component with a pressure rise delta P so that an approximately constant pressure is present at the following seal arrangement of the packing 6.

Suitable materials for the choke ring 2 or the support ring 1 are plastics such as, for example, polytetrafluoroethylene (PTFE) modified high temperature polymers such as poly (ether ether ketone) (PEEK), poly(ether ketone) (PEK) poly- imide (PI), poly(phenylene sulphide) (PPS), polybenzimidazole (PBI), polyamideimide (PAI) or also a modified epoxy resin.

What is claimed is:

1. The arrangement comprising a choke ring with a parting joint as well as a support ring arranged adjacent to and adjoining the choke ring for the covering over of the parting joint, wherein the choke ring has elastic properties such that the choke ring is leaky with respect to constant pressure components and has an increased sealing action with respect to dynamic pressure components.

2. The choke arrangement in accordance with claim 1 wherein the support ring has a cover region which is configured and arranged in such a manner that the parting joint is completely covered in the radial direction.

3. The choke arrangement in accordance with claim 1 wherein the choke ring consists of a plastic having elastic properties.

4. The choke arrangement in accordance with claim 1 wherein the choke ring has a constant width in the radial direction.

5. The choke arrangement in accordance with claim 1 wherein the width of the choke ring in the radial direction is greatest at a side lying opposite to the parting joint and diminishes towards the parting joint.

6. The choke arrangement in accordance with claim 1 wherein the choke ring has grooves extending in the radial direction.

7. The choke arrangement in accordance with claim 1 wherein the choke ring as well as the supporting have a common connection means in order to hold the rings in a mutually fixed position.

8. The choke arrangement in accordance with claim 1 wherein the support ring is configured as an endless ring.

9. The choke arrangement in accordance with claim 1 wherein the support ring surrounds an inner circle and has cut-outs on the side facing the inner circle, the cut-outs extending over an entire axial height of the support ring.

10. The choke arrangement in accordance with claim 1 wherein the choke ring has an axial height and wherein the surface facing the center of the support ring is made to extend cylindrically over a portion of the height and is made divergent over a further portion.

11. The choke arrangement in accordance with claim 1 wherein the choke ring or the support ring consists of a plastic, modified high-temperature polymer or a modified epoxy resin.

12. The choke arrangement in accordance with claim 1 wherein the choke ring or support ring consists of one of polytetrafluoroethylene (PTFE), poly (ether ether ketone) (PEEK), poly (ether keytone) (PEK), polyimide (PI), poly (phenylene sulphlide) (PPS), polybenzimidazole (PBI), or polyamideimide (PAI).

13. A sealing packing with a choke arrangement, the choke arrangement comprising:
a choke ring with a parting joint as well as a support ring arranged adjacent to and adjoining the choke ring for the covering over of the parting joint, wherein the choke ring has elastic properties such that the choke ring is leaky with respect to constant pressure components and has an increased sealing action with respect to dynamic pressure components.

14. A piston compressor with a choke arrangement, the choke arrangement comprising:
a choke ring with a parting joint as well as a support ring arranged adjacent to and adjoining the choke ring for the covering over of the parting joint, wherein the choke ring has elastic properties such that the choke ring is leaky with respect to constant pressure components and has an increased sealing action with respect to dynamic pressure components.

15. A method for damping or sealing dynamic pressure components with a choke arrangement, the choke arrangement comprising:

a choke ring with a parting joint as well as a support ring arranged adjacent to and adjoining the choke ring for the covering over of the parting joint, wherein the choke ring has elastic properties such that the choke ring is leaky with respect to constant pressure components and has an increased sealing action with respect to dynamic pressure components, the choke arrangement lying in contact with a sliding surface of a body to be sealed, the method comprising:

producing a force acting in a radial direction and directed towards the sliding surface on an elastic choke ring by a peak in pressure thereby pressing a sealing surface of the choke ring against the sliding surface such that an increased sealing action of the choke arrangement in the axial direction is achieved.

* * * * *